April 7, 1970   C. BILLES   3,505,447

SEGMENTAL TIRE MOLD AND METHOD OF MOLDING AN ASYMMETRIC TIRE

Filed Feb. 14, 1967   2 Sheets-Sheet 1

INVENTOR.
CLAUDE BILLES
BY
Henry Sternberg
ATTORNEY

April 7, 1970   C. BILLES   3,505,447
SEGMENTAL TIRE MOLD AND METHOD OF MOLDING AN ASYMMETRIC TIRE
Filed Feb. 14, 1967   2 Sheets-Sheet 2

INVENTOR.
CLAUDE BILLES
BY
ATTORNEY ically uniform. That
United States Patent Office 3,505,447
Patented Apr. 7, 1970

3,505,447
SEGMENTAL TIRE MOLD AND METHOD OF
MOLDING AN ASYMMETRIC TIRE
Claude Billes, Clairoix, France, assignor to Societe
Francaise du Pneu Englebert Margny-les-Compiegne,
Oise, France, a corporation of France
Filed Feb. 14, 1967, Ser. No. 615,952
Claims priority, application France, June 1, 1966,
63,783, Patent 1,488,376
Int. Cl. B28b 11/08
U.S. Cl. 264—293              15 Claims

ABSTRACT OF THE DISCLOSURE

In a method and an apparatus for forming asymmetric vehicular tires, a segmented tread-molding ring is radially contracted while it and a main molding assembly formed of a pair of side molding rings located at opposite axial ends of said tread molding ring, are relatively axially displaced with respect to one another.

---

This invention relates to the fabrication of vehicle tires, particularly pneumatic tires of the type generally called radial or radial ply tires.

Radial tires generally have a breaker or a belt interposed between the tread and the crown region of the carcass, and comprised of one or more plies of usually weftless cord fabric. In such a breaker, the cords are generally made of substantially inexpansible materials as, for example, metallic wires, glass filaments, polyester filaments, oriented substantially circumferentially of the tire.

The present invention stems from the recognition of the fact that tires are not always rigorously uniform. That is to say, tires are found to have both radial and lateral variations in uniformity.

These variations in the uniformity of the tire cause the tire and rim combination viewed as a whole to have variations of radial and lateral forces. This applies even more so in the case of radial ply tires, having, as previously stated, a breaker or belt incorporated between the crown region of the carcass and the surrounding tread band. Thus, any slight misalignment of the breaker, or any portion thereof, with respect to the beads of the tire, will result in an eccentric loading of the tire.

Apart from the above-mentioned variations in uniformity resulting from the manufacture of a tire, an additional lateral force on the tire may also exist due to the reaction between the tire and the ground resulting from a force due to the structure of the tire itself, namely, the orientation of the generally inextensible metal wires or other cord elements of the radially outermost ply of the breaker. This latter force is dependent upon the direction of rotation of the tire. Thus, depending on manufacturing tolerances in positioning of the breaker with respect to the beads, etc., and the ultimate direction of rotation of the tire, different tires may exert different lateral forces on the vehicle on which they are mounted. For example, if at the front of such a vehicle the sum of the lateral forces of the two tires exceeds a certain value the vehicle tends to pull to the right or to the left depending on the direction of the summation of such lateral forces.

It has been proposed to overcome the above deficiencies by constructing an asymmetric tire. In other words, it has been proposed to provide means in the tire, i.e. part of the tire structure itself, which will establish an asymmetry of the geometry of the tire sufficient to superimpose thereon a lateral force of predetermined direction. It has been proposed to accomplish this through the formation of a predetermined asymmetry of the tread and, if desired, also the breaker region of the tire. Such a tire is designed and specified for use in a predetermined direction of rotation. For example, the tire is designated for use as a left hand or right hand tire. The direction of the lateral forces is, therefore, no longer left to chance since a predetermined, relatively larger, lateral force of predetermined direction is superimposed over the inherent relatively smaller lateral forces of unpredictable magnitude and direction.

The foregoing may be achieved in a number of ways including the fabrication of a tire with a breaker which is slightly asymmetric with respect to the median equatorial plane of the tire, or the fabrication of a tire with a tread band a part or all of which has a somewhat conical shape, or by a combination of the foregoing, namely an asymmetric, or conically shaped tread band, together with an asymmetric or conically shaped breaker.

Those skilled in the art are familiar with the methods and apparatus for making tires of symmetrical geometry with reinforcement breakers. Generally, such tires are molded in conventional molds composed of two mold shells. The raw carcass is subjected to an internal fluid pressure by means of a core in the form of an extensible curing bag which is expanded inside of the carcass during the molding process. It is known to provide such molds with radially moveable segments which make it possible to avoid stretching the reinforcement breaker under the effect of the strong internal pressure. Up to now great care was taken to assure that these radially moveable segments move solely in radial direction and not in any other direction so as to prevent, as far as possible, any decentering of any kind, or uncontrollable misalignment of the cords of the reinforcement breaker during the molding process. For this purpose, the radially moveable segments were mounted, with respect to the corresponding mold halves, in such a manner as to permit only pure radial movement, i.e. movement normal to the tire axis. It is further known to construct such molds with the moveable tread ring segments cooperating with the upper and lower mold shells, respectively, by means of corresponding conical surface portions inclined at identical angles with respect to the median plane of the mold, so that movement of the mold shells toward each other results in pure centripetal movement of the tread ring segments.

It is also known to manufacture tires with asymmetrical structure using conventional molds which do not have radially moveable segments, however, and which require, on the one hand, the preliminary formation of an asymmetric breaker, an asymmetric tread band, or both, and on the other hand, require costly and tedious methods in order to control and maintain the initial asymmetry during the molding and curing steps.

It is an object of the present invention, therefore, to provide relatively simple and economical means for fabrication of asymmetric tires.

It is another object of the present invention, to provide a method of fabricating asymmetric tires using carcasses which are partially formed in the conventional manner, i.e. which are of symmetrical construction.

It is a further object of the present invention to provide a novel mold for practicing the above method.

The foregoing and other objects, characteristics and advantages of the present invention will be more clearly understood from the following detailed description when read in conjunction with the accompanying drawings, in which.

Figure 1:
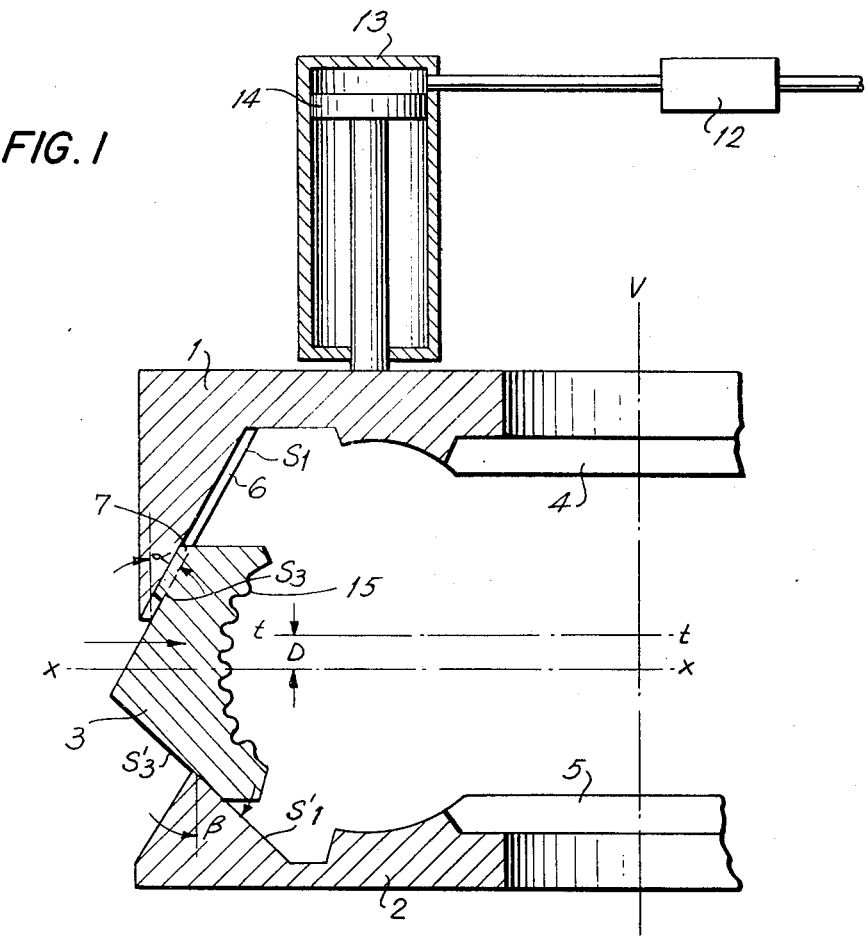
FIGS. 1 and 2 are diagrammatic, partly sectional, transverse illustrations of a portion of a mold according to the present invention.
Figure 2:
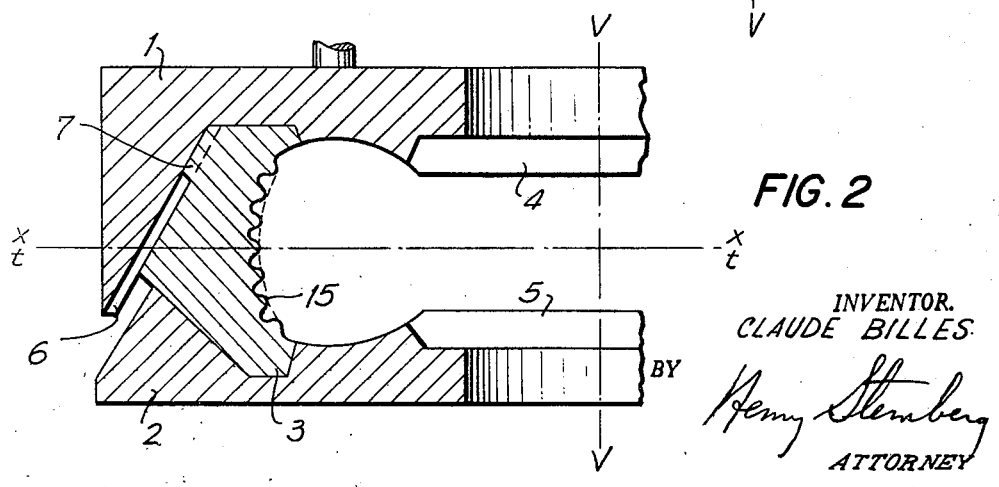
Figure 3:
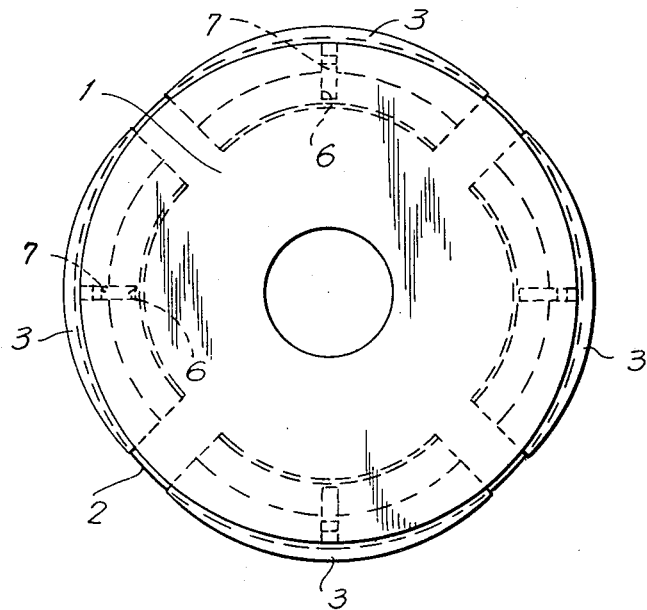
FIG. 3 is a diagrammatic top plan view of the mold according to FIGS. 1 and 2, showing the mold in the open position of FIG. 1.

Referring now to the drawings in greater detail, and first to FIGS. 1 and 2, where there is shown a mold according to the present invention in open and closed position, respectively. As seen in FIGS. 1 and 2, the composite tire mold according to the present invention comprises a pair of axially opposed annularly shaped main molding rings 1 and 2 constituting a main molding assembly, or main molding means. Each of the rings 1 and 2 is formed with an annular cavity corresponding to the sidewalls of a pneumatic vehicle tire, and with annular portions 4 and 5, respectively, for accepting the opposite beads of a tire carcass. The main molding assembly 1, 2 may be horizontally disposed with ring 1 constituting an upper and ring 2 constituting a lower mold member. Rings 1 and 2 may be mounted for movement toward each other in symmetry with a median plant $t$—$t$ which represents the median equatorial plane of the assembled mold halves 1 and 2. Alternatively, one of the main mold rings may be maintained stationary while the other main mold ring may be mounted for relative movement with respect thereto in a generally axial direction. Thus, for example, main mold ring 2 may be stationary while ring 1 may be mounted for generally up and down movement with respect to ring 2.

In the illustrated embodiment each of the main mold rings 1 and 2 is provided with an inwardly facing conicial wall $S_1$ and $S'_1$, respectively. A tread molding means in the form of a segmental, intermediate, tread-forming assembly or ring 3, is located between the main mold rings 1 and 2 and is provided with opposite conical outer surface portions $S_3$ and $S'_3$, corresponding respectively to surfaces $S_1$ and $S'_1$. The conicity of the main mold ring seat $S_1$ is such that it is different from the conicity of the opposing main mold ring seat $S'_1$. The angle of inclination, with respect to the vertical, of the line of intersection of a central vertical plane and the conical surface $S_1$ is indicated in FIG. 1, by the angle $\alpha$, while the corresponding angle of the surface $S'_1$ is indicated by the angle $\beta$. In the embodiment illustrated in FIG. 1 the angle $\beta$ exceeds substantially the angle $\alpha$ so that the angle of inclination of the coacting surfaces $S_1$ and $S_3$, with respect to a line parallel to the vertical axis V—V of the mold, is substantially less than the corresponding angle of inclination of the coacting surfaces $S'_1$ and $S'_3$.

FIG. 1 illustrates the mold, according to the present invention, in open condition with the opposing main mold rings 1 and 2 axially spaced from one another and with the segmental thread-molding ring 3 in expanded condition. The median plane of the asymmetrically formed tread molding ring assembly 3 is indicated at X—X, which latter plane is seen, in the mold open position of FIG. 1, to be spaced a distance D from the median equatorial plane $t$—$t$ of the main mold assembly 1, 2. Individual segments of the tread-molding ring 3 may include dove-tail portions 7 which mate with axially extending grooves 6, circumferentially spaced about the interior of main mold ring 1. Dove-tails 6 are slidingly received in the grooves 7 and thus prevent circumferential displacement of the individual segments of tread ring 3 during closing of the mold.

Figure 4:
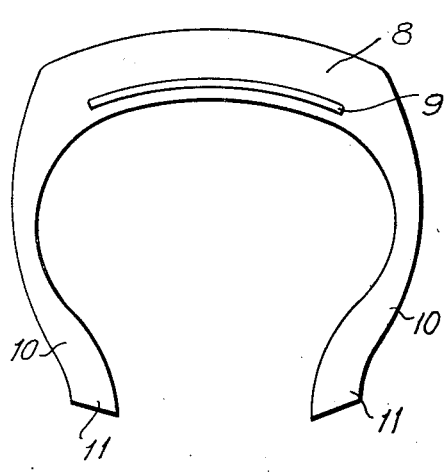
FIG. 4 is a diagrammatic, transverse or radial section through a partially finished tire prior to operating thereon in accordance with the present invention.

In operation, a tire is partially formed in the conventional manner, i.e., with the conventional symmetrical configuration illustrated in FIG. 4. The tread band portion 8 is provided with a reinforcement breaker 9 extending circumferentially of the tire. Both the tread band portion 8 and the reinforcement breaker 9 are formed in the conventional manner i.e., substantially symmttrical with respect to the sidewalls 10 and the bead portions 11 of the carcass. At least the tread band portion 8 of the tire is, however, maintained in uncured condition. The conventionally formed, partly completed, tire with its uncured tread band portion 8, is then placed into a mold such as the one illustrated in FIG. 1. Thereafter, at least one of the opposed mold rings 1 and 2 is moved axially with respect to the other by conventional means while pressure is applied to the interior of the partially formed carcass of the tire, also by conventional means, tending to expand the tire. As will be seen from the drawings, movement of the mold portions 1 or 2 toward the other from the FIG. 1 position thereof into the FIG. 2 position thereof, results, due to the conical coacting surfaces $S_1$, $S_3$ and $S'_1$, $S'_3$, respectively, in a contracting of the segmented tread molding ring 3. The segments of the latter are moved, as a result of the coacting inclined surfaces, into engagement with the uncured tread band of the tire located in the mold (but not illustrated in FIGURES 1 and 2) so that the embossed tread pattern interior portion 15 of the tread molding ring 3 presses into the uncured tread band material forming the tread pattern thereon.

During axial movement of at least one of the mold portions 1 and 2 toward the other, their respective seat portions, having the conical surfaces $S_1$ and $S'_1$, respectively, slide with respect to the coacting surfaces $S_3$ and $S'_3$, respectively, of the segmented tread molding ring 3, causing the segments of that ring to move radially inwardly toward the vertical axis V—V of the mold, thus contracting the tread-molding ring assembly 3. Such inward movement of the individual tread-molding segments, impresses the tread pattern of portion 15 into the tread band of the tire.

As previously noted, the tread-molding means 3 is initially (FIG. 1) in a mold-open position, displaced a distance D with respect to the median plane $t$—$t$ of the main mold means 1, 2. In the embodiment illustrated, the angle $\beta$ exceeds substantially the angle $\alpha$ and the segmented tread molding ring 3 is located on the side of median plane $t$—$t$ which is closer to main mold ring 2. Since $\alpha$ and $\beta$ are of substantially different magnitude, the segments of the tread molding ring 3 will move not only radially but also axially to a position in which (as seen in FIG. 2) the median plane $x$—$x$ of tread-mold means 3 is coincident with the median plane $t$—$t$ of the main mold means 1, 2.

Thus, as a result of the difference in inclination of the surfaces $S_1$ and $S'_1$, respectively, axial movement of member 1 toward member 2, causes the segments 3 not only to move radially toward the axis V—V of the mold but also to move axially, i.e. in a direction parallel to axis V—V, with respect to the mold assembly 1, 2. During closing of the mold there takes place, therefore, a relative axial movement not only between the mold portions 1 and 3 and the mold portions 2 and 3, respectively, but also a relative axial displacement of the tread-molding assembly 3 with respect to the main mold assembly 1, 2. Thus, the tread ring 3 which was initially displaced by a distance D is seen, in the mold closed position shown in FIG. 2, to have moved into alignment with the median plane $t$—$t$ of the mold assembly 1, 2. By moving simultaneously radially and axially with respect to the main mold assembly 1, 2, during closing of the mold, the tread forming ring assembly 3 contracts onto, and simultaneously axially displaces at least a portion of, the tread band 8 of a tire located in the mold. During movement from the FIG. 1 to the FIG. 2 position thereof, the tread band ring 3 thus not only forms the tread pattern on the tread band 8, which latter, as noted above is still uncured, but simultaneously displaces a portion of the tread band 8 and if desired also a portion of the reinforcement breaker 9, axially, with respect to the remaining portions of the tire.

Figure 5:
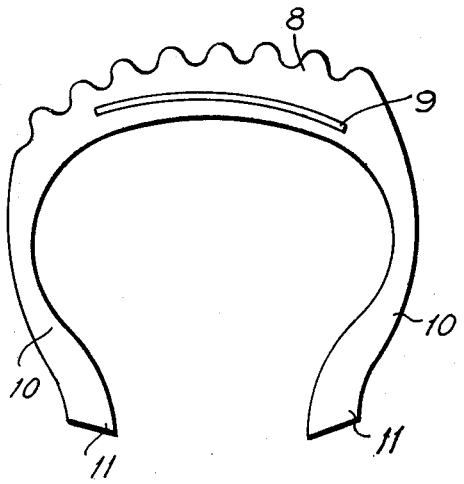
FIG. 5 is a diagrammatic, transverse or radial section of a tire formed in accordance with the present invention.

A conventionally constructed, partially completed, tire is shown diagrammatically in FIG. 4. Such tire carcass is reshaped, by moving the mold sections 1, 2 and 3 into the FIG. 2 positions thereof, into the asymmetric shape shown in somewhat exaggerated manner in FIG. 5. As seen in FIG. 5 the tread band 8, formed in the above manner with a tread pattern, is asymmetrical with respect to the median equatorial plane $t$—$t$ of the remaining, inner, portions 10 and 11 of the tire, while the reinforcement breaker 9 has been partially shifted and slightly conically oriented all as a result of the combined centripetal and axial movement of the segments of tread forming ring assembly 3 with respect to the main molding assembly 1, 2, during closing of the mold.

After the mold has reached its fully closed position, illustrated in FIG. 2, the mold is maintained in this closed position for a predetermined amount of time and at a predetermined temperature until the tire, or at least the uncured portion thereof, is cured. Once cured, the tire casing may be removed from the mold and will maintain the assymmetric shape previously described.

It will be understood that, as a consequence of the different angles of inclination of the opposed conical surfaces $S_1$ and $S'_1$ on the portions 1, 2, respectively, the axial speed, during closing of the mold of the tread-mold ring means 3, differs from the axial speed of movement of the median plane $t$—$t$ of the main mold assembly 1, 2. Thus, where, as in the embodiment illustrated, mold member 2 is maintained stationary while mold member 1 is moved axially with respect thereto, the rate of axial descent of the median plane $t$—$t$ (i.e. the instantaneous median plane of the main mold assembly 1, 2) is greater than the rate of axial descent of the tread-forming ring assembly 3, so that the median planes $t$—$t$ and $x$—$x$ merge when the mold is fully closed, i.e., reaches its FIG. 2 position.

The tread-molding ring 3 may itself be constructed asymmetrically with respect to its own median plane $x$—$x$, as shown in FIGS. 1 and 2, and this non-symmetry of the impressed tread design, together with the axial displacement of the tread-molding ring assembly 3 with respect to the main-mold assembly 1, 2 provides the desired asymmetry of tire tread and reinforcement breaker with respect to the inner, remaining, portions of the tire carcass. Thus, it should be noted that the composite relative radial and axial movements of the mold assemblies may, if desired, be such as to cause not only the tread band 8 but also the breaker 9 to become shifted out of symmetry with the remaining tire portions.

In the illustrated embodiment, only the main molding ring 1 is moved with respect to the lower mold ring 2 and this may be accomplished by a conventional piston-cylinder arrangement 13, 14 only schematically illustrated in FIG. 1. Pressure fluid from the source 12 is directed to the cylinder 13 which is fixed and which causes the piston 14 to move axially thus imparting axial motion to the ring 1 fixedly connected thereto. Ring 2 is rigidly mounted and acts as a support for the remaining mold portions 1 and 3.

In accordance with the present invention the desired asymmetry of construction may be achieved either by displacing the tread band 8, or portions thereof, or by displacing the tread band 8 together with all, or a portion, of the reinforcement breaker 9 as seen in FIG. 5.

It is to be understood that the foregoing description is illustrative only and that the various constructions disclosed herein and the method of operation are susceptible to a number of variations and modifications.

Having thus described the invention, what is claimed and desired to be secured by Letters Patent is:

1. In a mold for vehicle tires, in combination,
   a main molding assembly including a pair of axially opposed main holding rings;
   a tread-molding assembly including a segmental tread-molding ring interposed between said main molding rings of said main molding assembly, said rings together defining an annular space for receiving a partly formed tire;
   and means for relatively axially displacing said tread molding ring a different amount with respect to each of said pair of main molding rings in response to relative movement toward each other of said main molding rings and for simultaneously therewith radially contracting said tread-molding ring toward a tire located in said space, whereby the tread portion of the tire in said space is displaced axially with respect to the remaining portions of the tire.

2. A mold according to claim 1, said main molding rings respectively including interior seat portions having differently inclined outer walls, said segmental tread-molding ring having at its periphery a pair of inclined surface portions corresponding to and respectively cooperating with said outer walls, said cooperating inclined outer walls and surface portions constituting said means for radially contracting said tread-molding ring and for axially displacing said one assembly with respect to the other assembly, said latter means being responsive to movement of said one molding ring axially toward the other.

3. A mold according to claim 2, wherein said inclined outer walls are conically shaped each having a different conicity, said surface portions being also conically shaped and having respectively a conicity corresponding to the respective outer wall.

4. A mold according to claim 2, wherein said surface portions of said tread-molding rings are located respectively in oppositely converging conical surfaces of revolution.

5. A mold according to claim 2, wherein said main molding assembly is substantially horizontally arranged, said one main molding ring being the upper main mold ring and movable along a vertical axis toward and away from the other lower main molding ring.

6. A mold according to claim 1, wherein said segmental tread-molding ring includes an inner tread forming surface portion which is asymmetric with respect to the median equatorial plane of said tread-molding ring, said means being arranged to displace said tread molding ring, in response to movement of said one main ring toward said other main ring, from a position in which said plane is axially spaced from the median equatorial plane of said main mold assembly to a position in which said plane is closer to the median equatorial plane of said main molding assembly.

7. A mold according to claim 1, said means for relatively displacing said rings being operatively connected with both said assemblies for radially contracting and axially displacing said tread-molding ring in response to axial movement of said one ring with respect to said other ring.

8. A mold according to claim 7, wherein said means cooperates with said assemblies to move said tread-molding ring axially at a rate of speed different from the axial rate of speed of said one main molding ring.

9. A mold according to claim 1, said means being operatively connected to said one main molding ring and to said tread molding ring so as to contract and simultaneously axially displace said tread molding ring, in response to movement in axial direction of said one molding ring toward said other molding ring, between a first mold-open position in which said main rings are spaced from each other and a second mold-closed position in which said main molding rings are located closer to each other and together with said tread-molding ring fully enclose a tire located in said space, said tread-molding ring being located in said mold open position thereof, with its equatorial median plane parallel to but spaced a predetermined distance from the equatorial plane of said main molding assembly, said tread molding ring contracting radially into engagement with a peripheral tread band portion of the tire located in the mold and simultaneously displacing such peripheral portion axially with respect to the remainder of the tire in response to movement of said one main ring toward the other, said tread molding ring maintaining the portions of the tire in such relatively shifted positions as long as said mold remains in said second closed position so that the tire may be cured in such condition so as to form a permanently asymmetric tire structure.

10. In a method of forming an asymmetric pneumatic tire, the steps of: forming an at least partially uncured tire carcass having an inner portion and a tread band surrounding said inner portion; applying to substantially the entire outer cylindrical portion of the tread band an inwardly and simultaneously axially directed force relative to said inner portion for displacing said tread band and said inner portion relatively a predetermined axial distance; and curing the tire carcass while maintaining said tread band and said inner portion in said relatively displaced condition so that the tire will set with said tread band displaced said predetermined axial distance with respect to the inner portion of the tire.

11. In a method according to claim 10, said step of displacing comprising
moving toward each other, against opposite sides of said tire located therebetween, a pair of axially opposed molding rings constituting a main molding means;
contracting against the tread band of the tire a tread-molding means which surrounds the tread band of the tire and which is located intermediate the opposed molding rings of the main molding means; and simultaneously therewith moving one of the molding means axially with respect to the other.

12. A method according to claim 11 wherein the tread-molding means is moved axially with respect to the main molding means from a first mold-open position in which the median equatorial plane of the tread means is displaced from the median plane of the main molding means, to a mold-closed second position in which the median equatorial plane of the tread-mold means coincides with the median plane of the main mold means thereby shifting the asymmetrically arranged tread band of the tire, during closing of the mold, to a position in which the tread band is asymmetrical with respect to the remaining portions of the tire.

13. In a method according to claim 11, further comprising the step of forming a tread pattern on the tread band simultaneously with contracting said tread ring.

14. In a method according to claim 10, wherein the tread band of the tire is formed with a substantialy symmetrically arranged reinforcement breaker, the step of displacing at least a portion of the reinforcement breaker simultaneously with said axial displacement of the tread band.

15. In a method of forming an asymmetric pneumatic tire having an inner portion and a tread band surrounding the inner portion, from a partially finished symmetrically shaped tire of which at least the tread band is uncured, in combination, the steps of:

placing the tire in a composite mold having a pair of axially opposed main mold portions for engaging the inner tire portions of the tire located therebetween, and a segmental tread ring portion intermediate the main mold portions and surrounding the tread band of a tire located therein;

relatively moving said main mold portions axially toward one another against opposite sides of the inner portion of the tire located therebetween to hold such inner portion against axial movement;

contracting said segmented tread ring portion into engagement with the tread band of the tire while simultaneously relatively displacing said tread ring portion with respect to the inner tire portion by a predetermined axial distance to thereby displace the tread band by such distance;

and curing the tire while maintaining the tread band portion and the inner portion in such displaced relative positions so that the tread band portion will set and thereafter permanently remain in such axially displaced position.

References Cited

UNITED STATES PATENTS

| | | |
|---|---|---|
| 906,256 | 12/1908 | Mell. |
| 1,599,772 | 9/1926 | Krusemark. |
| 1,604,452 | 10/1926 | Krusemark. |
| 2,959,817 | 11/1960 | Bank _____ 18—38 X |
| 3,337,918 | 8/1967 | Pacciarini _____ 264—315 X |
| 3,347,964 | 10/1967 | Sidles _____ 264—326 X |
| 3,396,221 | 8/1968 | Balle _____ 18—17 X |
| 1,781,658 | 11/1930 | Keller. |
| 3,082,480 | 3/1963 | Balle. |
| 3,395,745 | 8/1968 | Massoubre _____ 152—361 |
| 3,435,874 | 4/1969 | Mirtain et al. _____ 152—352 |

FOREIGN PATENTS

| | | |
|---|---|---|
| 1,448,109 | 6/1966 | France. |
| 975,644 | 11/1964 | Great Britain. |

ROBERT F. WHITE, Primary Examiner

N. RUSHEFSKY, Assistant Examiner

U.S. Cl. X.R.

18—17, 42; 264—326